(12) United States Patent
Tiwari et al.

(10) Patent No.: US 8,515,393 B2
(45) Date of Patent: Aug. 20, 2013

(54) APPARATUSES AND METHODS FOR HANDLING NETWORK INITIATED DETACHMENT PROCEDURES

(75) Inventors: Kundan Tiwari, Taoyuan County (TW); Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 358 days.

(21) Appl. No.: 13/012,594

(22) Filed: Jan. 24, 2011

(65) Prior Publication Data

US 2011/0217951 A1    Sep. 8, 2011

Related U.S. Application Data

(60) Provisional application No. 61/311,609, filed on Mar. 8, 2010.

(51) Int. Cl.
*H04M 1/66* (2006.01)

(52) U.S. Cl.
USPC ........ 455/411; 455/433; 455/434; 455/435.2; 455/518; 455/519

(58) Field of Classification Search
USPC .............. 455/411, 433, 434, 435, 435.2, 518, 455/519, 520
See application file for complete search history.

(56) References Cited

U.S. PATENT DOCUMENTS

2007/0037597 A1* 2/2007 Biswas et al. ............. 455/518
2008/0320149 A1* 12/2008 Faccin ..................... 709/228

OTHER PUBLICATIONS

3rd Generation Partnership Project (3GPP). "Technical Specification Group Core Network and Terminals; Mobile radio interface Layer 3 specification; Core network protocols; Stage 3 (Release 9)." 3GPP TS 24.008 V9.1.0, (Dec. 2009).
3rd Generation Partnership Project (3GPP). "Technical Specification Group Core Network and Terminals; Non-Access-Stratum (NAS) protocol for Evolved Packet System (EPS); Stage 3 (Release 9)." 3GPP TS 24.301 V9.1.0, (Dec. 2009).
3rd Generation Partnership Project (3GPP). "Technical Specification Group Radio Access Network; Mobility Procedures for Home NodeB; Overall Description; Stage 2 (Release 9)." 3GPP TS 25.367 V9.1.0, (Sep. 2009).
3GPP TSG-CT WG1 Meeting #64, "Clarification to network initiated detach procedure with cause #25," Kyoto, Japan, May 10-14, 2010, XP-002639094, 4 pgaes total.
3GPP TS 24.301 V8.10.0 (Jun. 2011); 3rd Generation Partnership Project; Technical Specification Group Core Network and Terminals; Non-Access-Stratum (NAS) protocol for Evolved Packet System (EPS); Stage 3 (Release 8); 277 pages.

* cited by examiner

*Primary Examiner* — Manpreet Matharu
(74) *Attorney, Agent, or Firm* — Birch, Stewart, Kolasch & Birch, LLP

(57) ABSTRACT

A mobile communications device with a wireless module and a controller module is provided. The wireless module performs wireless transmissions and receptions to and from a cellular station. The controller module receives a detachment request message comprising a detachment cause from the cellular station via the wireless module, and determines whether the detachment cause indicates unauthorized membership of a closed subscriber group (CSG) supported by the cellular station. Also, the controller module determines whether the cellular station is a non-CSG cell in response to the detachment cause indicating unauthorized membership of the CSG supported by the cellular station, and keeps an allowed CSG list unmodified in response to the cellular station being a non-CSG cell.

14 Claims, 6 Drawing Sheets

APPARATUSES AND METHODS FOR HANDLING NETWORK INITIATED DETACHMENT PROCEDURES

CROSS REFERENCE TO RELATED APPLICATIONS

This Application claims priority of U.S. Provisional Application No. 61/311,609, filed on Mar. 8, 2010, and the entirety of which is incorporated by reference herein.

BACKGROUND OF THE INVENTION

1. Field of the Invention

The invention generally relates to handling abnormal detachment procedures, and more particularly, to apparatuses and methods for handling a detachment procedure initiated by a non-CSG (closed subscriber group) cellular station, in which the detachment cause indicates unauthorized membership of the CSG supported by the cellular station.

2. Description of the Related Art

In a typical mobile communication environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

Take the WCDMA technology in compliance with the 3GPP TS 24.008 specification, v.9.1.0 (referred to herein as the 24.008 specification) for example. After a UE is powered on and connects to the WCDMA network, it will need to perform an attachment procedure to register itself to the WCDMA network so that it can obtain packet data services from the WCDMA network. As shown in FIG. 1, the attachment procedure starts by the UE transmitting an ATTACH REQUEST message to the WCDMA network (step S110). When receiving the ATTACH REQUEST message, the WCDMA network authenticates the UE, checks if the UE is authorized to have access to packet data services, and performs a security mode control procedure to activate the encryption on the subsequent messages in the connection (step S120). If none of the checks fail, the WCDMA network accepts the attach request by transmitting an ATTACH ACCEPT message to the UE (step S130). Specifically, the ATTACH ACCEPT message includes configuration information for activating the logical links and bearers for the packet data services, such as the Packet Data Protocol (PDP) context and the multimedia broadcast/multicast services (MBMS) contexts. In response to the ATTACH ACCEPT message, the UE establishes the logical links and the bearers for the packet data services according to the configuration information (step S140), and transmits an ATTACH COMPLETE message to the WCDMA network (step S150), to acknowledge that it has received the ATTACH ACCEPT message. If the ATTACH COMPLETE message is received successfully, the attachment procedure ends and the packet data services may be provided to the UE. Later, a detachment procedure may be initiated to de-register the UE from the WCDMA network. The UE may initiate the detachment procedure for reasons, such as the switching off of the UE, the removal of the Universal Subscriber Identity Module (USIM) card, or disablement of the packet data service module of the UE. Alternatively, the UE may handover to another WCDMA network where the UE does not have access to the packet data service, and the WCDMA network may initiate the detachment procedure.

FIG. 2 is a message sequence chart illustrating a detachment procedure initiated by the WCDMA network. The detachment procedure may be initiated by the WCDMA network for various reasons, such as for when the packet data services are not allowed for the UE, the UE is forbidden to access the current location area or the WCDMA network, or the UE is not authorized for the CSG supported by the current cell. The WCDMA network first transmits a DETACH REQUEST message to the UE to request the UE to de-register itself from the WCDMA network (step S210). When receiving the DETACH REQUEST message, the UE deactivates the established logical links and bearers for the packet data services (step S220). Subsequently, the UE transmits a DETACH ACCEPT message to the WCDMA network to inform that the detachment procedure is completed (step S230). After transmitting the DETACH ACCEPT message, the UE may further determine whether to re-attach to the WCDMA network according to the detachment type included in the DETACH REQUEST message. If the detachment type indicates "re-attach not required", the UE stays in the de-registered state. Otherwise, the UE initiates another attachment procedure to activate new logical links and bearers for the packet data services. However, there are abnormal cases that may occur during the detachment procedure, causing the registered or de-registered state of the UE to be out-of-sync between the UE and the WCDMA network.

BRIEF SUMMARY OF THE INVENTION

Accordingly, embodiments of the invention provide apparatuses and methods for handling a network initiated detachment procedure. In one aspect of the invention, a mobile communications device with a wireless module and a controller module is provided. The wireless module performs wireless transmissions and receptions to and from a cellular station. The controller module receives a detachment request message comprising a detachment cause from the cellular station via the wireless module, and determines whether the detachment cause indicates unauthorized membership of a CSG supported by the cellular station. Also, the controller module determines whether the cellular station is a non-CSG cell in response to the detachment cause indicating unauthorized membership of the CSG supported by the cellular station, and keeps an allowed CSG list unmodified in response to the cellular station being a non-CSG cell.

In another aspect of the invention, a method for handling a network initiated detachment procedure by a mobile communications device wirelessly connected to a cellular station is provided. The method comprises the steps of receiving a detachment request message comprising a detachment cause from the cellular station, determining whether the detachment cause indicates unauthorized membership of a CSG supported by the cellular station, determining whether the cellular station is a non-CSG cell in response to the detachment cause indicating unauthorized membership of the CSG supported by the cellular station, and keeping an allowed CSG list unmodified in response to the cellular station being a non-CSG cell.

Other aspects and features of the present invention will become apparent to those with ordinarily skill in the art upon review of the following descriptions of specific embodiments of apparatuses and methods for handling a network initiated detachment procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

A WCDMA network or an LTE network may comprise femtocells which are commonly designed for residential or small business environments, and can provide wireless coverage to UEs using the WCDMA technology or LTE technology to communicate with the UEs and an existing broadband Internet connection (e.g., digital subscriber line (DSL), cable, etc.) for backhaul. When configured in a closed mode, a femtocell only provides access to a limited set of UEs, wherein the limited set may be referred to as a CSG. The CSG which is associated with a femtocell is configured during the set-up of the femtocell and is denoted by its CSG Identity (CSG ID). The network operator allocates CSG ID values throughout the network, and multiple femtocells may be part of the same CSG, e.g. they will in this case have the same CSG ID allocated. The list of CSGs, for which an end user belongs to, is maintained as part of the subscriber information and may be referred to as an allowed CSG list which keeps a plurality of CSG IDs, each corresponding to a respective cell that the UE is authorized to access. The allowed CSG list is stored on the USIM card/UE and the operator's core network as part of the subscriber data. Regarding detailed descriptions of the CSG, reference may be made to the 3GPP TS 25.367 specification, v.9.1.0.

Note that during the conventional detachment procedure described above, if the detachment cause included in the DETACH REQUEST message indicates "Not authorized for this CSG" which means unauthorized membership of the CSG supported by the current cell, the UE will further modify the locally stored allowed CSG list by removing the CSG ID of the current cell. However, there are situations where the detachment cause may be wrongly configured in the DETACH REQUEST message by the WCDMA or LTE network or a fake cell may maliciously forge such a DETACH REQUEST message to the UE. In these cases, the modification of the allowed CSG list may cause the UE to be unable to obtain normal packet data services and further cause impairment of user experience. In order to solve this problem, the invention provides an improved detachment procedure for the UE to correctly identify whether the modification of the allowed CSG list should be performed when the detachment cause indicates unauthorized membership of the CSG supported by the current cell.

Figure 1:
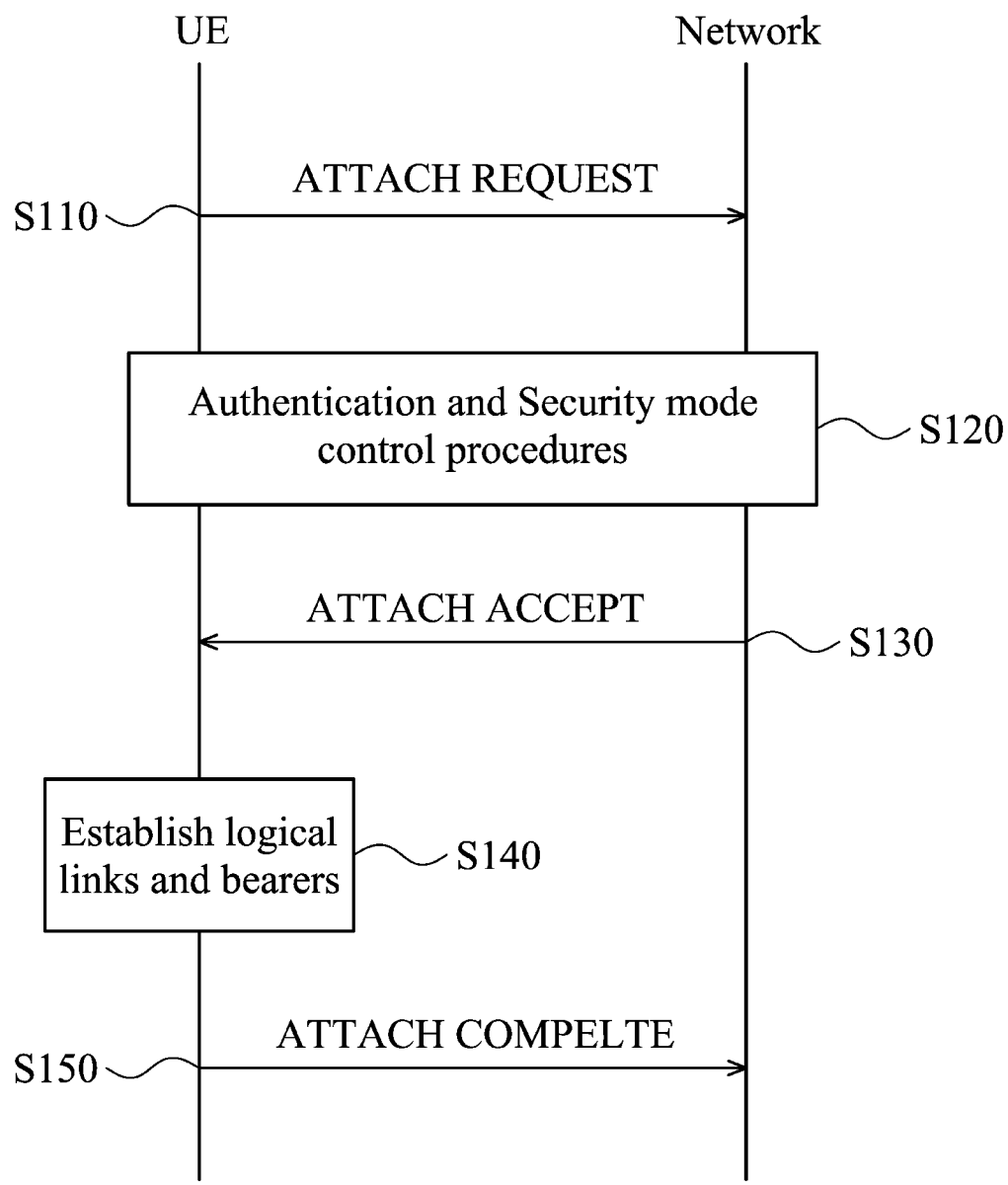
FIG. 1 is a message sequence chart illustrating an attachment procedure performed by a UE to a WCDMA network.
Figure 2:
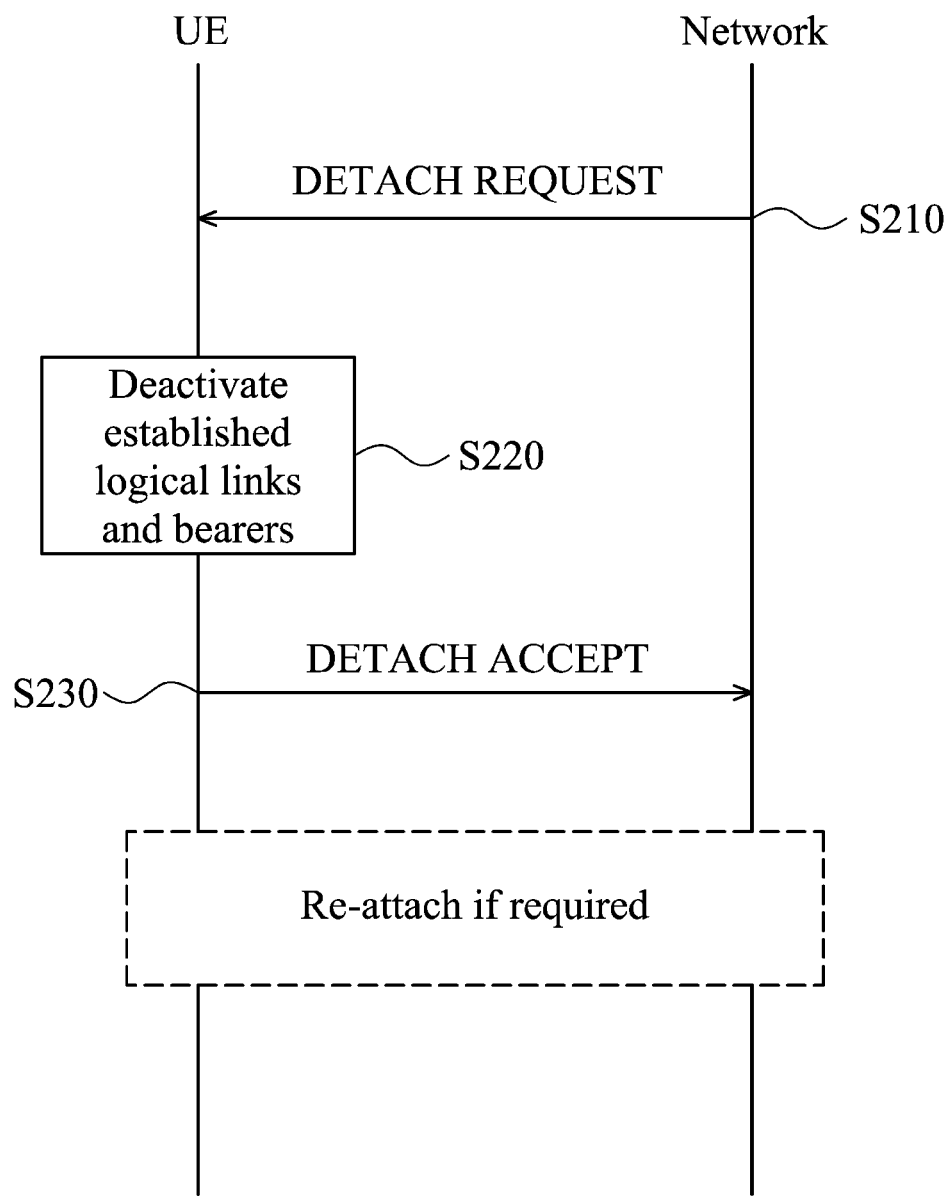
FIG. 2 is a message sequence chart illustrating a detachment procedure initiated by the WCDMA network.
Figure 3:
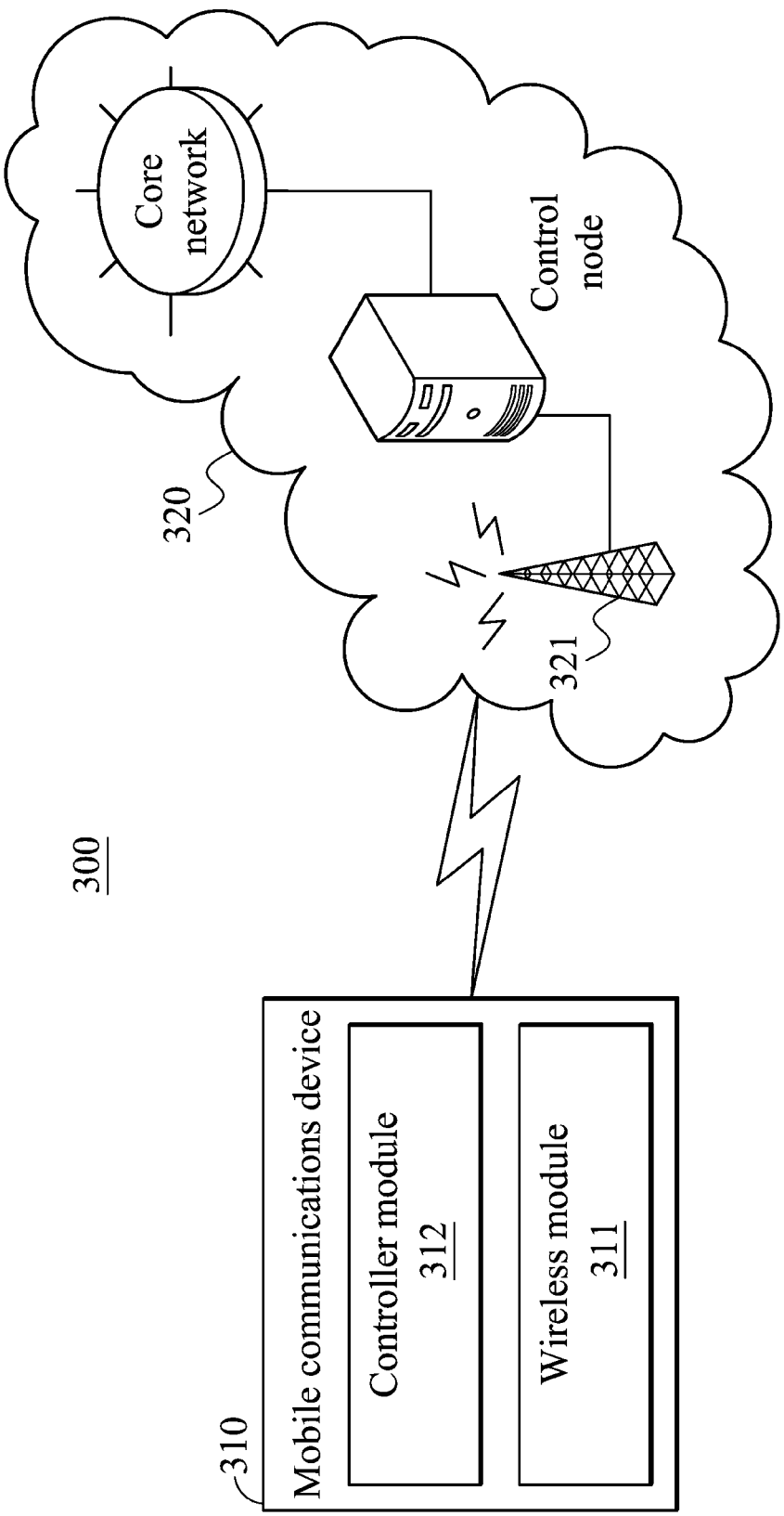
FIG. 3 is a block diagram illustrating a mobile communication environment according to an embodiment of the invention.

FIG. 3 is a block diagram illustrating a mobile communication environment according to an embodiment of the invention. In the mobile communications environment 300, the mobile communications device 310 is wirelessly connected to the cellular station 321 of the service network 320 for obtaining wireless services. Generally, the cellular station 321 may be referred to as a base station or an access station. The mobile communication device 310 comprises a wireless module 311 for performing the functionality of wireless transmissions and receptions to and from the cellular station 321. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6G Hz utilized in LTE systems, or others depending on the radio access technology (RAT) in use. Also, the mobile communication device 310 comprises a controller module 312 for controlling the operation of the wireless module 311 and other functional components, such as a display unit and/or keypad serving as the MMI (man-machine interface), a storage unit storing the program codes of applications or communication protocols, or others. In one embodiment, the service network 320 may be a WCDMA network and the mobile communications device 310 may be a UE in compliance with the 24.008 specification and other related specifications of the WCDMA technology; while in another embodiment, the service network 320 may be an LTE network and the mobile communications device 310 may be a UE in compliance with the 3GPP TS 24.301 specification, v.9.1.0 (referred to herein as the 24.301 specification) and other related specifications of the LTE technology. Alternatively, the mobile communications device 310 may be a UE in compliance with both of the specifications of the WCDMA and LTE communication protocols, and the invention is not limited thereto.

Figure 4:
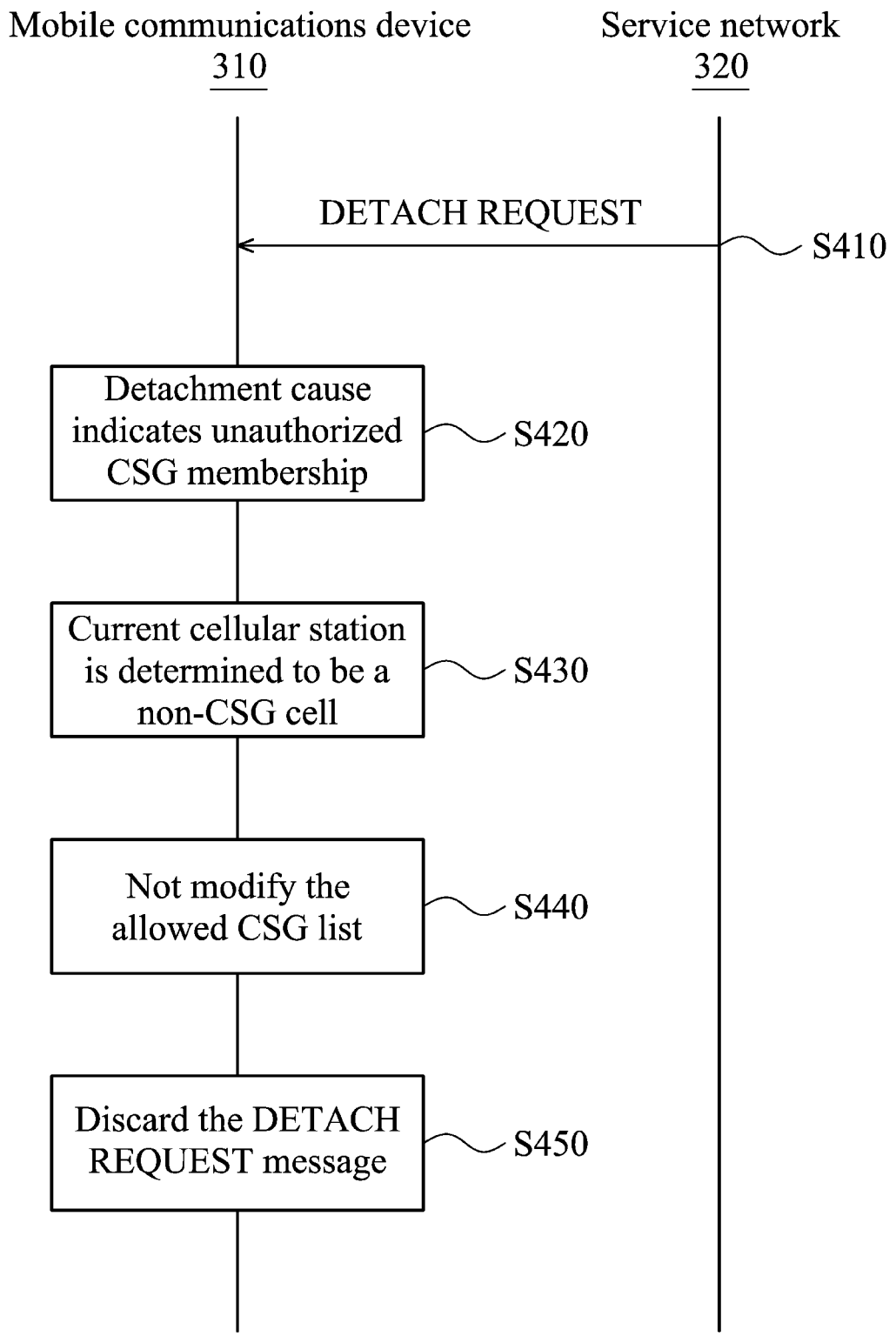
FIG. 4 is a message sequence chart illustrating a detachment procedure according to an embodiment of the invention.

To be more specific, the controller module 312 controls the wireless module 311 for performing a detachment procedure with the service network 320 via the cellular station 321. FIG. 4 is a message sequence chart illustrating a detachment procedure according to an embodiment of the invention. To start the detachment procedure, the controller module 312 receives a detachment request message comprising a detachment cause from the cellular station 321 via the wireless module 311 (step S410). Next, the controller module 312 determines whether the detachment cause indicates "Not authorized for this CSG", which means unauthorized membership of the CSG supported by the cellular station 321. In this embodiment, it is determined that the detachment cause does indicate unauthorized membership of the CSG supported by the cellular station 321 (step S420). Thus, the controller module 312 further determines whether the cellular station 321 is a non-CSG cell. Note that, before the detachment procedure, the controller module 312 may have received system information, such as SIB (System Information Block)-1 and SIB-3 of a WCDMA network or SIB-1 of an LTE network, from the cellular station 321 via the wireless module 311, indicating whether the cellular station 321 is a CSG cell or non-CSG cell and indicating the CSG ID of the cellular station 321 if the cellular station 321 is a CSG cell. Based on the system information, the controller module 312 may determine whether the cellular station 311 is a non-CSG cell according to the system information received from the cellular station 321. In this embodiment, it is determined that the detachment cause indicates unauthorized membership of the CSG supported by the cellular station 321, but the cellular station 321 is a non-CSG cell (step S430), which means that the detachment request message is abnormal. Accordingly, the controller module 312 keeps the allowed CSG list unmodified (step S440), and discards the detachment request message (step S450). Thus, ending the detachment procedure.

Figure 5:
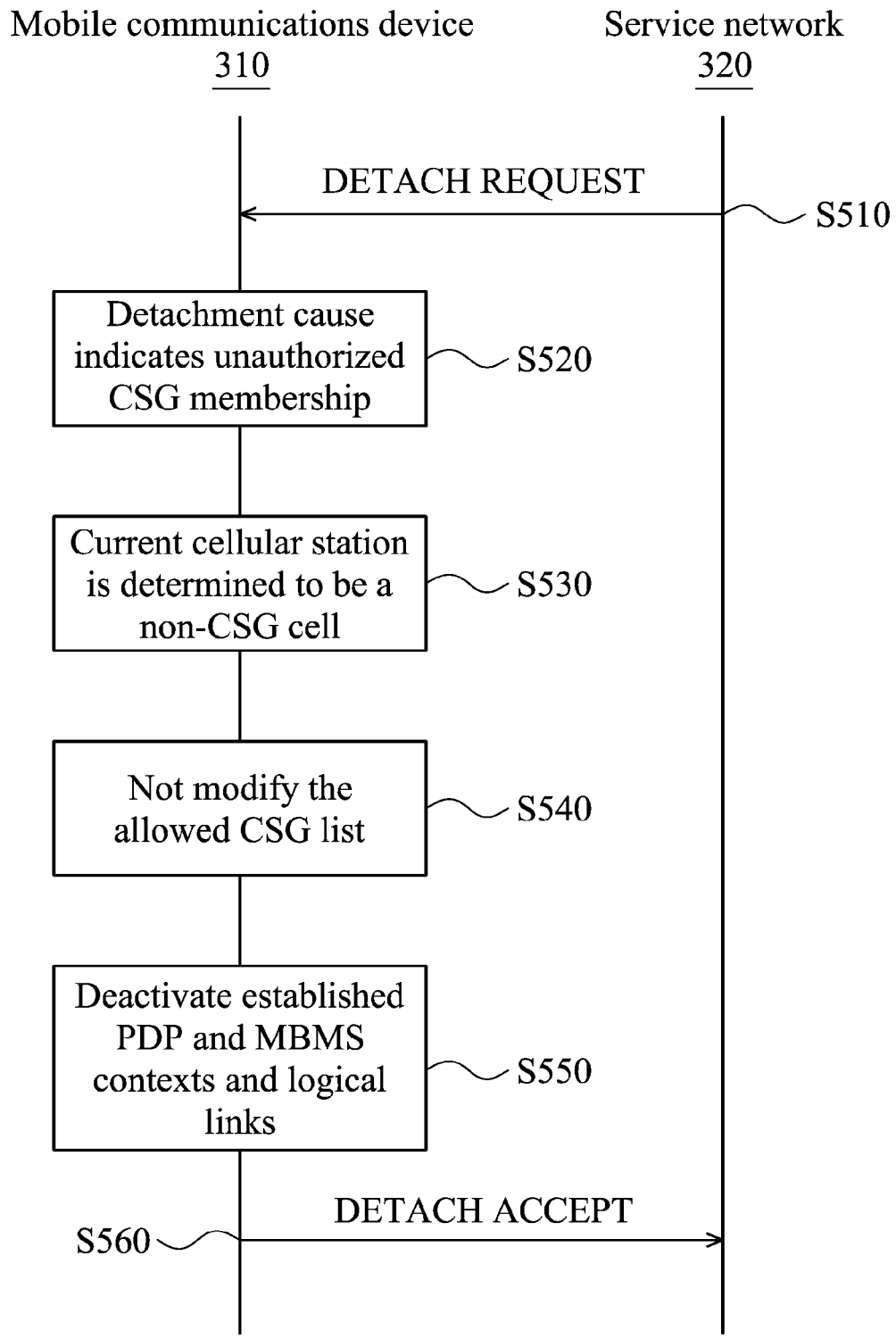
FIG. 5 is a message sequence chart illustrating a detachment procedure according to another embodiment of the invention.

FIG. 5 is a message sequence chart illustrating a detachment procedure according to another embodiment of the invention. Similar to FIG. 4, the detachment procedure is started by receiving a detachment request message comprising a detachment cause from the cellular station 321 (step S510). Next, the controller module 312 determines whether the detachment cause indicates "Not authorized for this CSG", which means unauthorized membership of the CSG supported by the cellular station 321. In this embodiment, it is determined that the detachment cause indicates unauthorized membership of the CSG supported by the cellular station 321 (step S520), so the controller module 312 further determines whether the cellular station 321 is a non-CSG cell. In response to the cellular station 321 being a non-CSG cell (step S530), the controller module 312 may be configured to handle the situation differently from the embodiment disclosed in FIG. 4. Specifically, in addition to keeping the allowed CSG list unmodified (step S540), the controller module 312 proceeds with a normal detachment procedure instead of discarding the detachment cause. That is, the controller module 312 performs a resource release procedure to deactivate the established PDP contexts, multimedia broadcast or multicast services (MBMS) contexts, and logical links (step S550). After the resource release procedure is finished, the controller module 312 then transmits a detachment acceptance message to the cellular station 321 via the wireless module 311 to end the detachment procedure (step S560). Note that the deactivated PDP contexts, MBMS contexts, and logical links were previously established during an attachment procedure prior to the detachment procedure. After being powered on and connected to the service network 320, the mobile communications device 310 performs the attachment procedure to register itself to the service network 320 and establish PDP contexts, MBMS contexts, and logical links, so that it can obtain packet data services from the service network 320.

It is noted that in FIG. 4 and FIG. 5, if the detachment cause indicates unauthorized membership of the CSG supported by the cellular station 321 and the cellular station 321 is a CSG cell, the controller module 312 proceeds to remove the CSG ID of the cellular station 321 from the allowed CSG list. The controller module 312 may compare the CSG ID to each of the CSG IDs stored in the allowed CSG list and determine if any match is found. If any match is found, the matched CSG ID in the allowed CSG list is deleted. Subsequently, the controller module 312 performs a resource release procedure as described in step S550 of FIG. 5 to deactivate the established PDP contexts, MBMS contexts, and logical links. Upon completion of the resource release procedure, the controller module 312 transmits a detachment acceptance message to the cellular station 321 via the wireless module 311. When receiving the detachment acceptance message from the mobile communications device 310, the service network 320 may consider that the detachment procedure has been completed. Regarding the operations of the mobile communications device 310 for the case where the detachment cause indicates a reason other than unauthorized membership of the CSG, reference may be made to the 24.008 specification or the 24.301 specification and thus, detailed descriptions are omitted here for brevity as it is beyond the scope of the invention.

Figure 6:
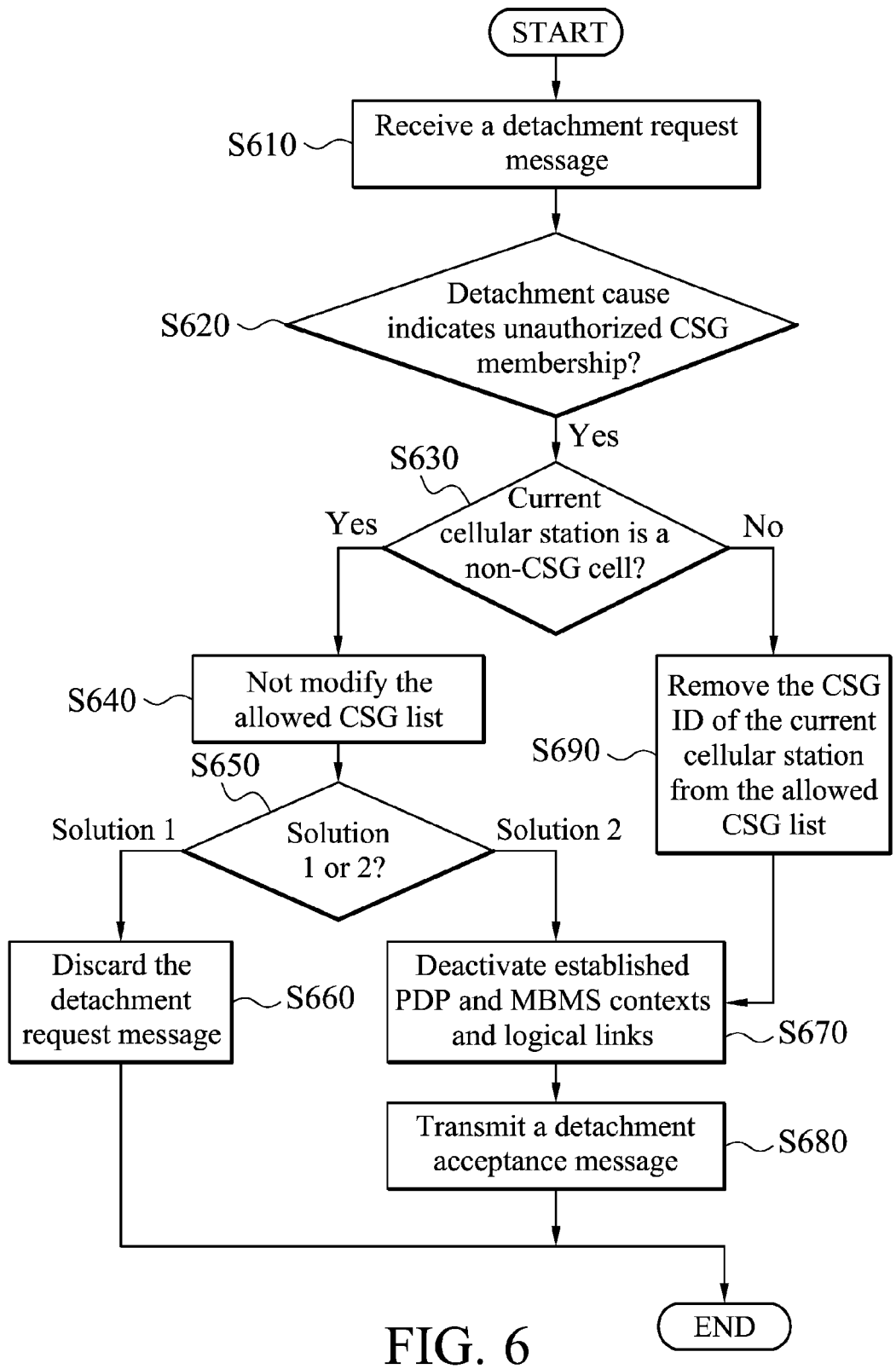
FIG. 6 is a flow chart illustrating a method for handling a network initiated detachment procedure by a mobile communications device according to an embodiment of the invention.

FIG. 6 is a flow chart illustrating a method for handling a network initiated detachment procedure by a mobile communications device according to an embodiment of the invention. In this embodiment, the mobile communications device is wirelessly connected to a cellular station of the service network which initiates the detachment procedure. The service network may initiate the detachment procedure for various reasons, such as for when the packet data services are not allowed for the UE, the UE is forbidden to access the current location area or the WCDMA network, or the UE is not authorized for the CSG supported by the current cell. The cellular station may be a base station or an access station of the service network for providing wireless connectivity to mobile users. To begin, the mobile communications device receives a detachment request message comprising a detachment cause from the cellular station (step S610). Next, the mobile communications device determines whether the detachment cause indicates unauthorized membership of the CSG supported by the cellular station (step S620). If so, the mobile communications device further determines whether the cellular station is a non-CSG cell (step S630). Note that, before the detachment procedure, the mobile communications device may have received system information from the cellular station, which indicates whether the cellular station is a CSG cell or non-CSG cell and indicates the CSG ID of the cellular station if the cellular station is a CSG cell. Based on the system information, whether the cellular station is a non-CSG cell may be determined. If it is determined that the detachment cause indicates unauthorized membership of the CSG supported by the cellular station but the cellular station is a non-CSG cell, it means that the detachment request message is abnormal. Accordingly, the mobile communications device keeps the allowed CSG list unmodified (step S640) and then determines to proceed with solution 1 or solution 2 (step S650). If solution 1 is selected, the mobile communications device discards the detachment request message (step S660), and the detachment procedure ends. If solution 2 is selected, the mobile communications device proceeds as a normal detachment procedure instead of discarding the detachment cause. That is, the mobile communications device performs a resource release procedure to deactivate the established PDP contexts, MBMS contexts, and logical links (step S670). Upon completion of the resource release procedure, the mobile communications device then transmits a detachment acceptance message to the cellular station to end the detachment procedure (step S680).

Subsequent to step S630, if it is determined that the detachment cause indicates unauthorized membership of the CSG supported by the cellular station 321 and the cellular station 321 is a non-CSG cell, the mobile communications device removes the CSG ID of the cellular station from the allowed CSG list (step S690). The mobile communications device may compare the CSG ID to each of the CSG IDs stored in the allowed CSG list and determine if any match is found. If any match is found, the matched CSG ID in the allowed CSG list is deleted. After removing the CSG ID of the cellular station from the allowed CSG list, the mobile communications device proceeds to step S670 to perform a resource release procedure in which the established PDP contexts, MBMS contexts, and logical links are deactivated. Lastly, in step S680, the mobile communications device transmits a detachment acceptance message to the cellular station to complete the detachment procedure. The method may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 312 in FIG. 3, the program code may perform the method for handling a network initiated detachment procedure. In addition, the method may be applied to any mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device, comprising:
a wireless module performing wireless transmissions and receptions to and from a cellular station;
a controller module receiving a detachment request message comprising a detachment cause from the cellular station via the wireless module, determining whether the detachment cause indicates unauthorized membership of a closed subscriber group (CSG) supported by the cellular station, determining whether the cellular station is a non-CSG cell in response to the detachment cause indicating unauthorized membership of the CSG supported by the cellular station, and keeping an allowed CSG list unmodified in response to the cellular station being a non-CSG cell,
wherein the controller module further discards the detachment cause, performs a resource release procedure, and transmits a detachment acceptance message to the cellular station via the wireless module to indicate completion of the detachment procedure, in response to the cellular station being a non-CSG cell.

2. The mobile communications device of claim 1, wherein the resource release procedure comprises deactivating established PDP contexts, multimedia broadcast or multicast services (MBMS) contexts, and logical links.

3. The mobile communications device of claim 2, wherein, prior to receiving the detachment request message, the controller module further transmits an attachment request to the cellular station via the wireless module, receives an attachment acceptance message from the cellular station via the wireless module, establishes the PDP contexts, the MBMS contexts, and the logical links according to the attachment acceptance message, and transmits an attachment completion message to the cellular station via the wireless module.

4. The mobile communications device of claim 1, wherein, prior to receiving the detachment request message, the controller module further receives system information from the cellular station via the wireless module, and whether the cellular station is a non-CSG cell is determined according to the system information.

5. The mobile communications device of claim 1, wherein the controller module further removes a CSG ID of the cellular station from the allowed CSG list, performs a resource release procedure, and transmits a detachment acceptance message to the cellular station via the wireless module to indicate completion of the detachment procedure, in response to the cellular station being a CSG cell.

6. The mobile communications device of claim 5, wherein the resource release procedure comprises deactivating established PDP contexts, MBMS contexts, and logical links.

7. The mobile communications device of claim 1, wherein the allowed CSG list comprises a plurality of CSG identities, each corresponding to a respective cellular station that the mobile communications device is authorized to access.

8. A method for handling a network initiated detachment procedure by a mobile communications device wirelessly connected to a cellular station, comprising:
receiving a detachment request message comprising a detachment cause from the cellular station;
determining whether the detachment cause indicates unauthorized membership of a CSG supported by the cellular station;
determining whether the cellular station is a non-CSG cell in response to the detachment cause indicating unauthorized membership of the CSG supported by the cellular station;
keeping an allowed CSG list unmodified in response to the cellular station being a non-CSG cell; and
discarding the detachment cause, performing a resource release procedure, and
transmitting a detachment acceptance message to the cellular station via the wireless module to indicate completion of the detachment procedure, in response to the cellular station being a non-CSG cell.

9. The method of claim 8, wherein the resource release procedure comprises deactivating established PDP contexts, MBMS contexts, and logical links.

10. The method of claim 9, further comprising, prior to receiving the detachment request message, transmitting an attachment request message to the cellular station via the wireless module, receiving an attachment acceptance message from the cellular station via the wireless module, establishing the PDP contexts, the MBMS contexts, and the logical links according to the attachment acceptance message, and the transmitting an attachment completion message to the cellular station via the wireless module.

11. The method of claim 8, further comprising, prior to receiving the detachment request message, receiving system information from the cellular station via the wireless module, wherein whether the cellular station is a non-CSG cell is determined according to the system information.

12. The method of claim 8, further comprising removing a CSG ID of the cellular station from then allowed CSG list, performing a resource release procedure, and transmitting a detachment acceptance message to the cellular station via the wireless module to indicate completion of the detachment procedure, in response to the cellular station being a CSG cell.

13. The method of claim 12, wherein the resource release procedure comprises deactivating established PDP contexts, MBMS contexts, and logical links.

14. The method of claim 8, wherein the allowed CSG list comprises a plurality of CSG identities, each corresponding to a respective cellular station that the mobile communications device is authorized to access.

* * * * *